Sept. 29, 1970  E. J. COHEN  3,530,622
BUILDING APPARATUS AND METHOD
Filed May 9, 1968  12 Sheets-Sheet 1

INVENTOR
EDWIN JACQUES COHEN
BY
Woodhams Blanchard & Flynn
ATTORNEYS

Sept. 29, 1970     E. J. COHEN     3,530,622
BUILDING APPARATUS AND METHOD
Filed May 9, 1968     12 Sheets-Sheet 2

INVENTOR
EDWIN JACQUES COHEN
BY
Woodhams, Blanchard & Flynn
ATTORNEYS

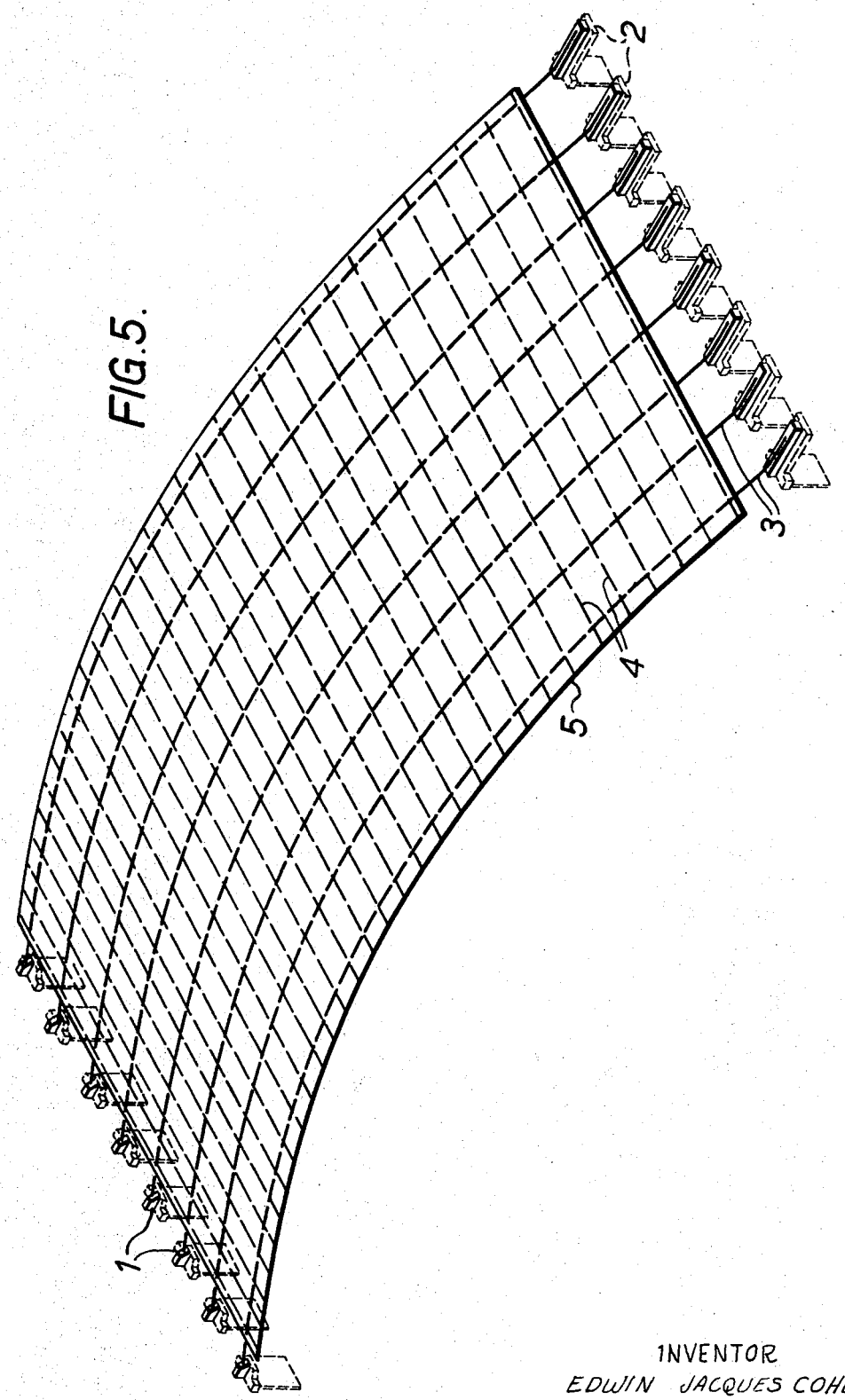

Sept. 29, 1970  E. J. COHEN  3,530,622
BUILDING APPARATUS AND METHOD
Filed May 9, 1968  12 Sheets-Sheet 4
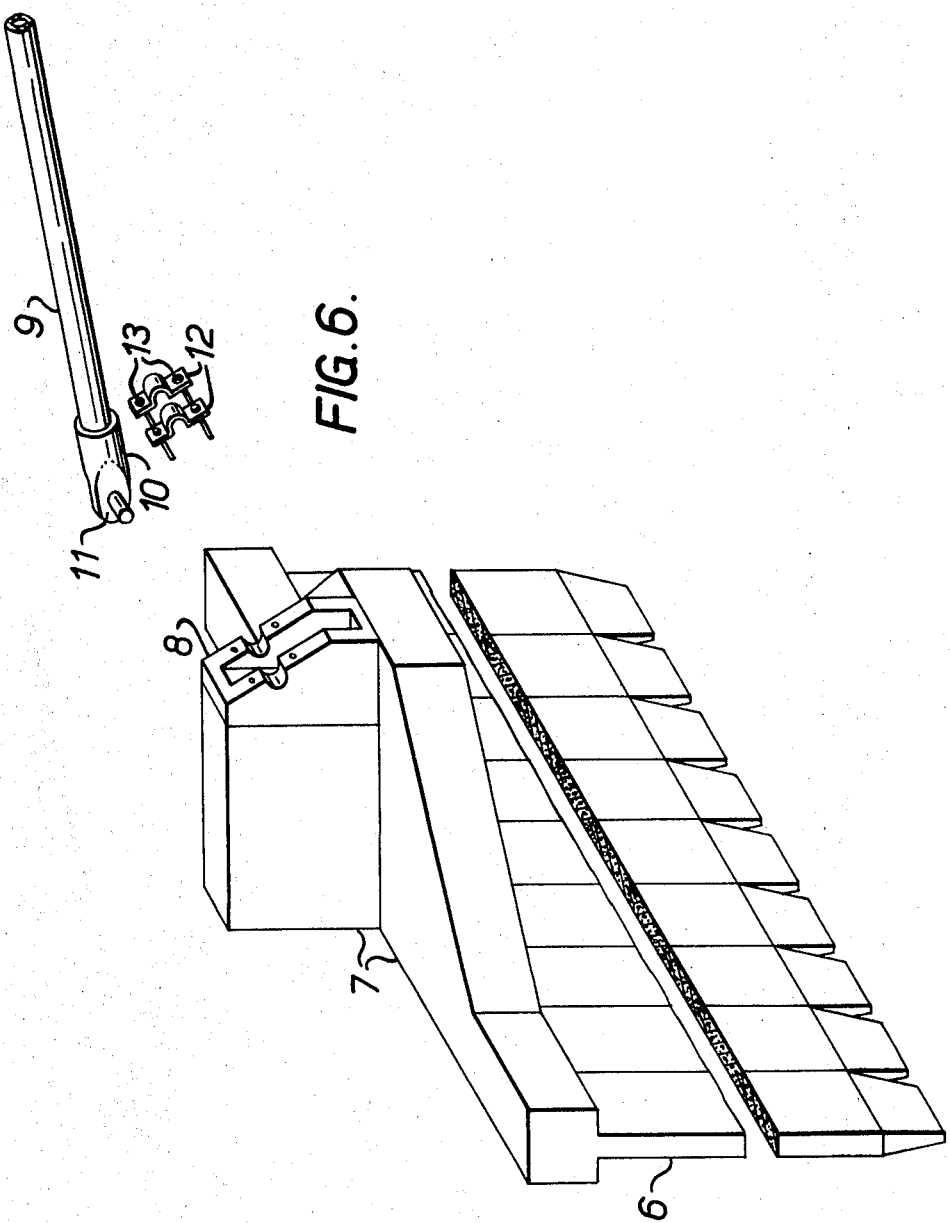
INVENTOR
EDWIN JACQUES COHEN
BY
Woodhams, Blanchard & Flynn
ATTORNEYS

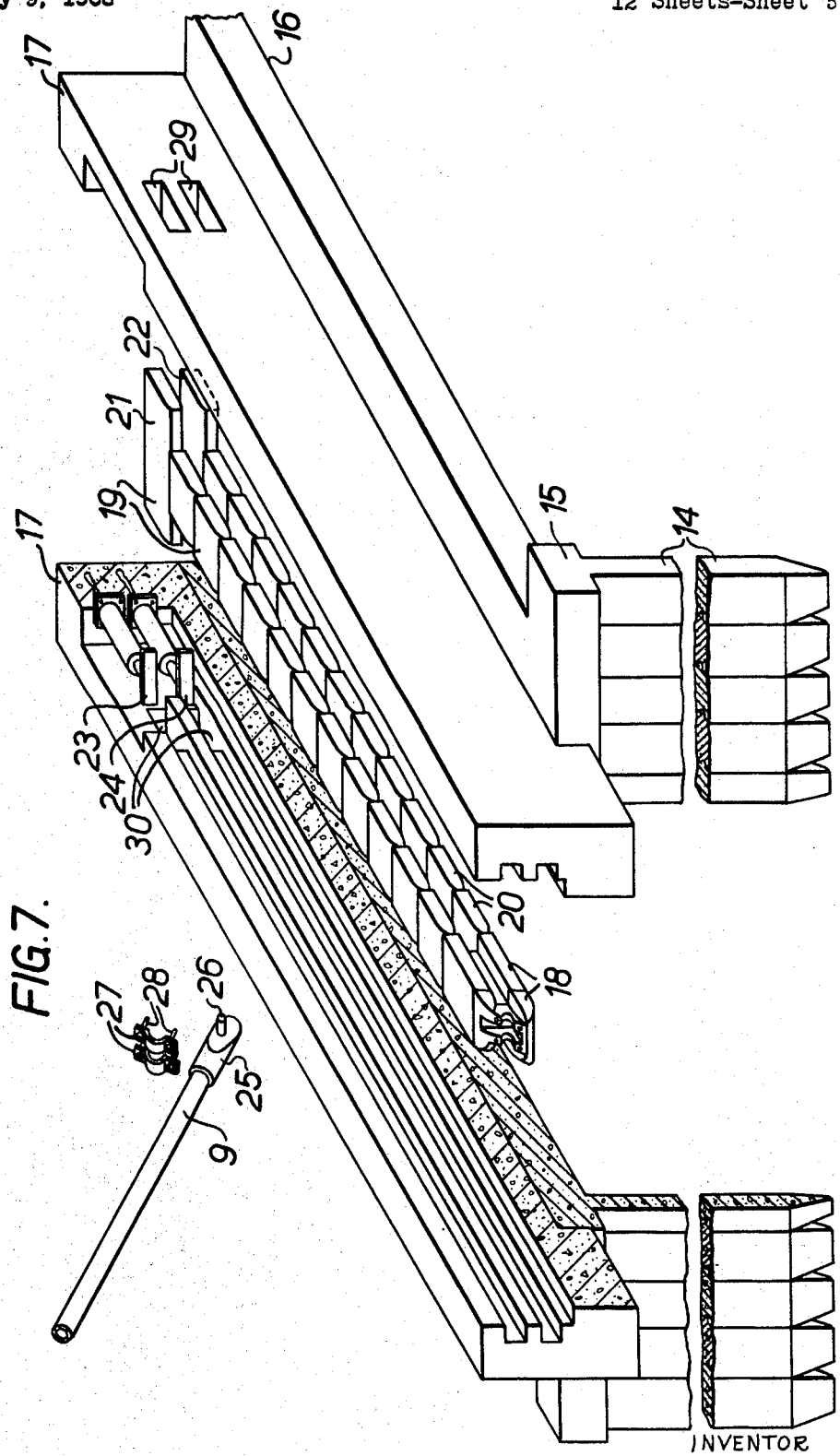

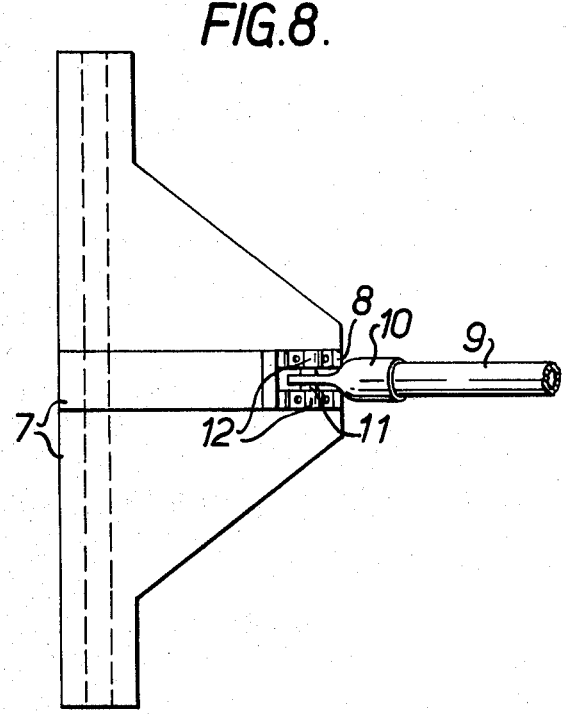
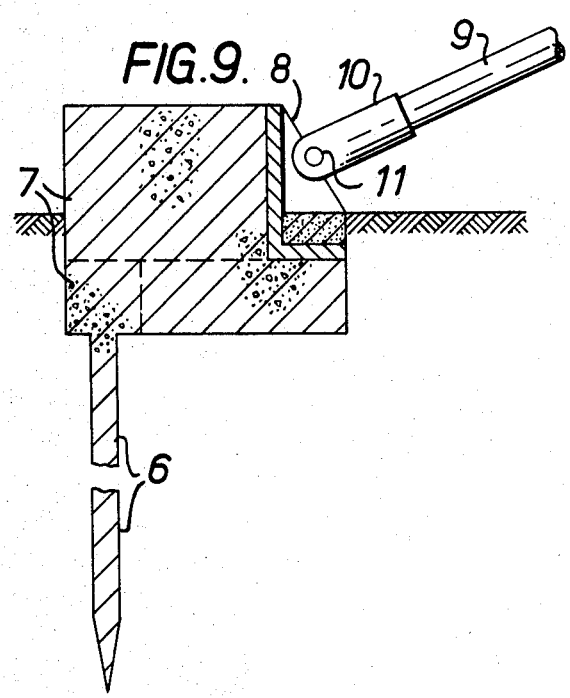

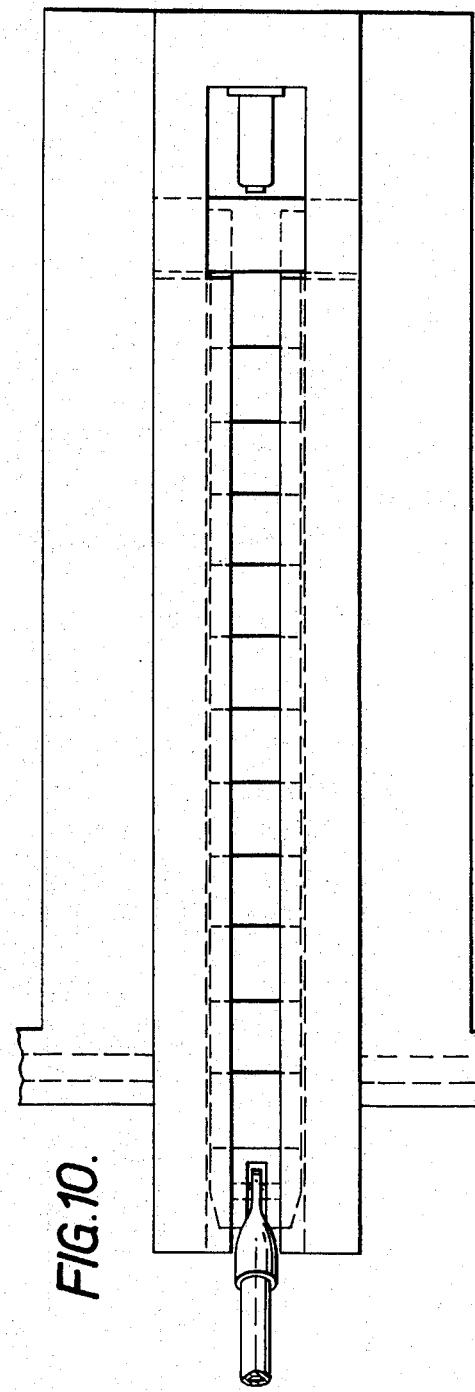
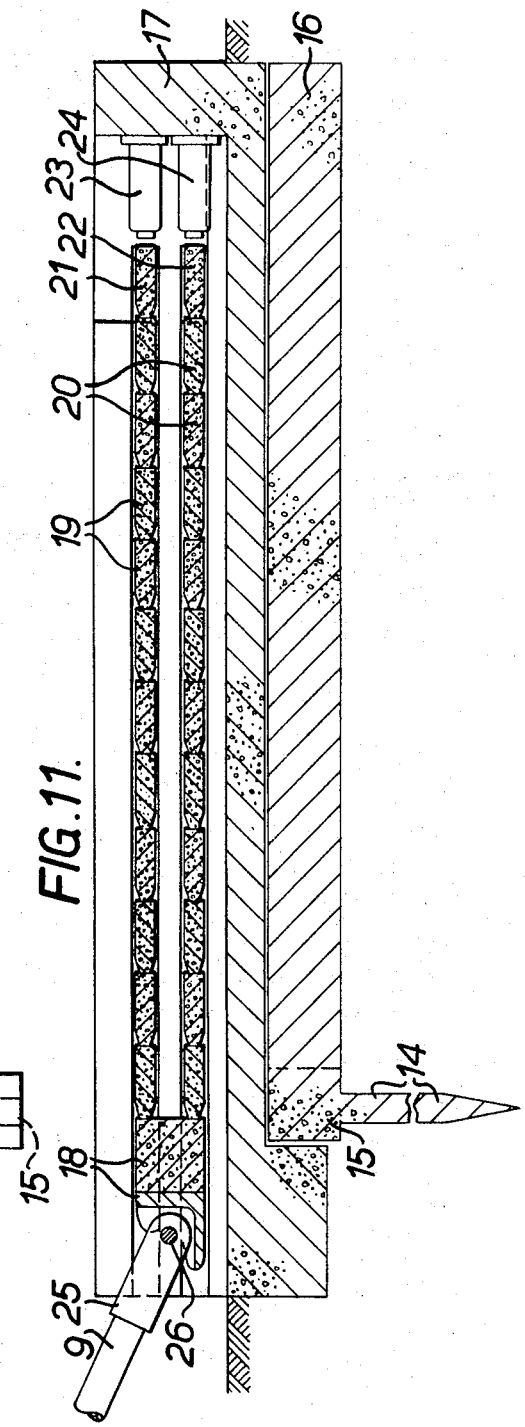

Sept. 29, 1970 E. J. COHEN 3,530,622
BUILDING APPARATUS AND METHOD
Filed May 9, 1968 12 Sheets-Sheet 8
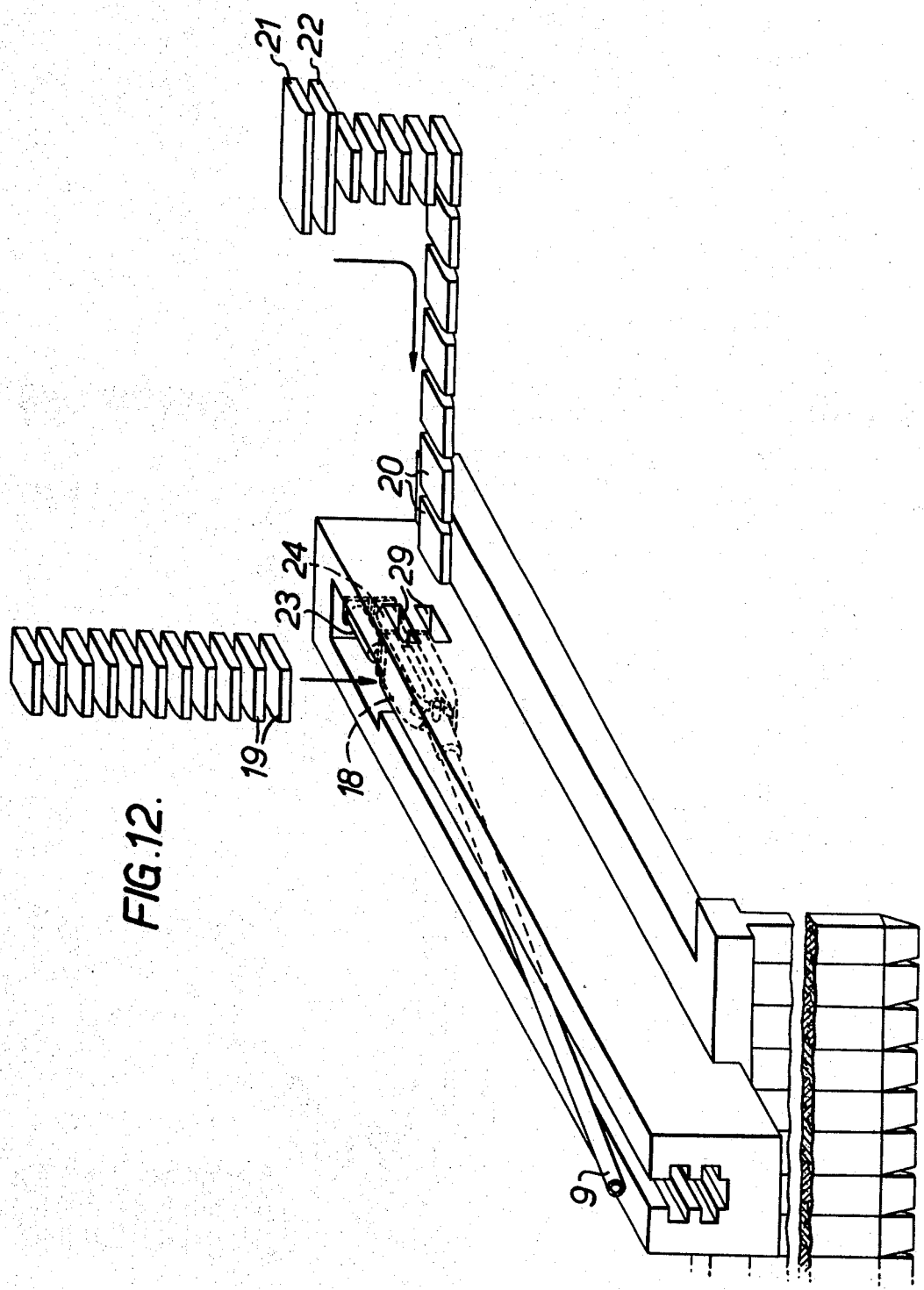
INVENTOR
EDWIN JACQUES COHEN
BY
Woodhams, Blanchard & Flynn
ATTORNEYS Sept. 29, 1970   E. J. COHEN   3,530,622
BUILDING APPARATUS AND METHOD
Filed May 9, 1968   12 Sheets-Sheet 9

INVENTOR
EDWIN JACQUES COHEN
BY
Woodhams, Blanchard & Flynn
ATTORNEYS

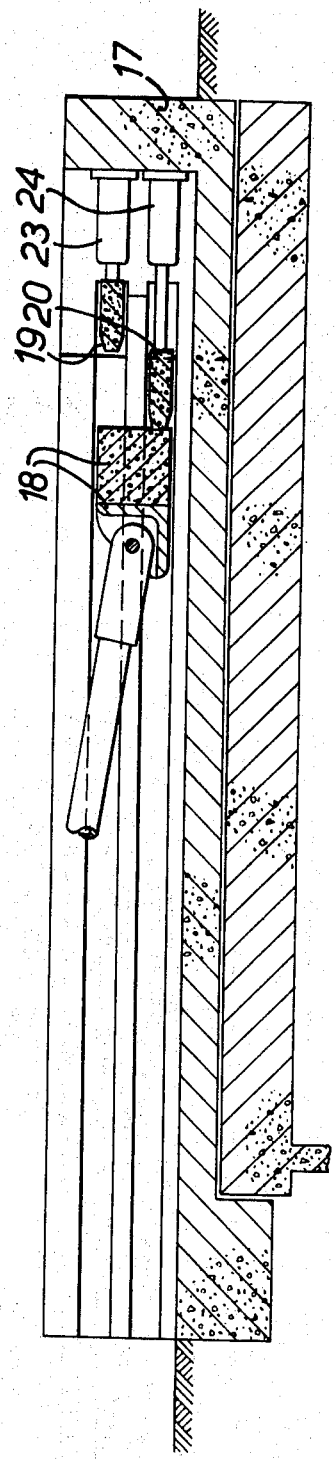
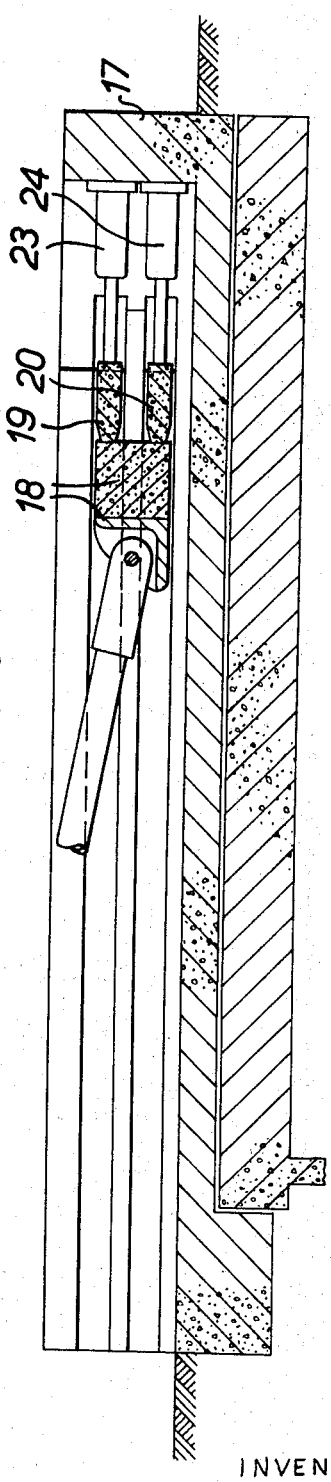

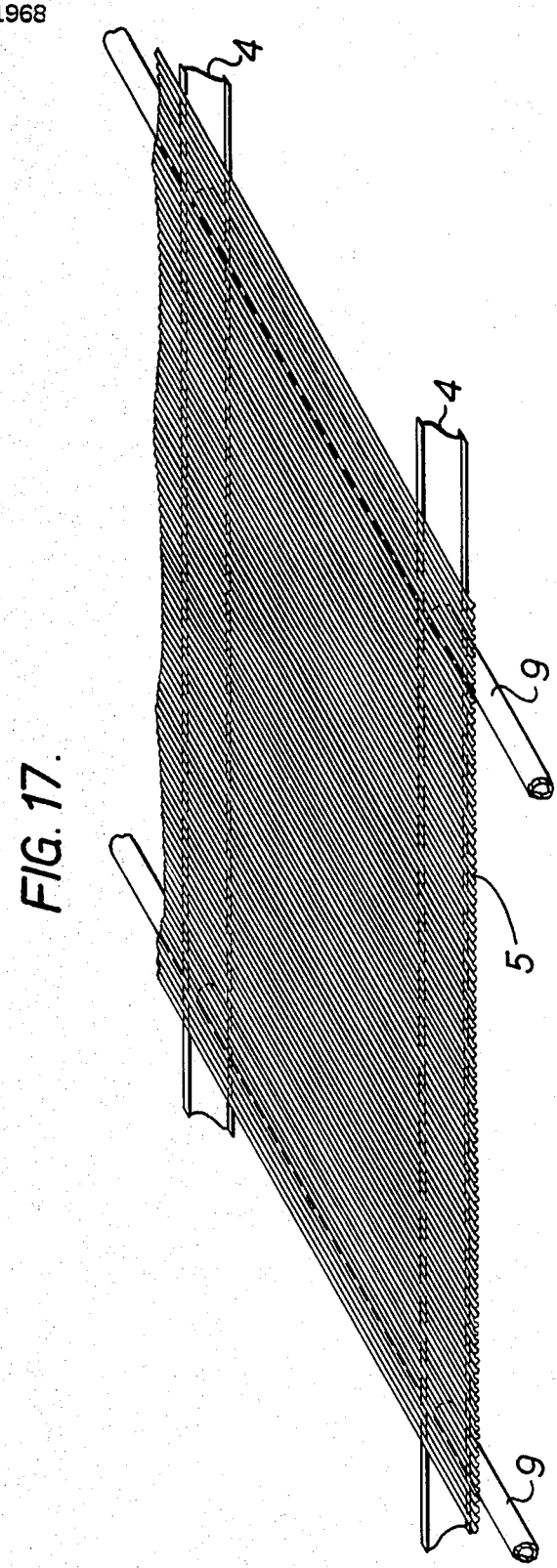

Sept. 29, 1970  E. J. COHEN  3,530,622
BUILDING APPARATUS AND METHOD
Filed May 9, 1968  12 Sheets-Sheet 12

INVENTOR.
EDWIN JACQUES COHEN
BY
Woodhams, Blanchard & Flynn
ATTORNEYS

United States Patent Office 3,530,622
Patented Sept. 29, 1970

3,530,622
BUILDING APPARATUS AND METHOD
Edwin Jacques Cohen, 20 Moreland Court,
Lyndale Ave., London, England
Continuation-in-part of application Ser. No. 639,449,
May 18, 1967. This application May 9, 1968, Ser.
No. 728,028
Claims priority, application Great Britain, May 23, 1966,
22,827/66; May 9, 1967, 21,597/67
Int. Cl. E04b *1/32;* E04g *21/00;* B23p *19/04*
U.S. Cl. 52—86                                    8 Claims

ABSTRACT OF THE DISCLOSURE

A method and an apparatus for erecting an arched building member by applying a longitudinal compressive force to the member so as to camber it upwardly to the required extent and then locking the cambered member in position.

CROSS REFERENCE TO RELATED APPLICATION

This application is a continuation-in-part of my copending application Ser. No. 639,449, filed May 18, 1967, now abandoned and entitled "Building Method."

FIELD OF THE INVENTION

The invention relates to a method and an apparatus for the erection of an arched, semiflexible, building member.

BACKGROUND OF THE INVENTION

The known methods of erecting arches either involve extensive use of temporary supports or difficult and dangerous operations with a crane.

It is an object of the invention to provide a method and an apparatus for the erection of an arched building member in which the disadvantages of the prior art are mitigated.

According to the invention there is provided a method and an apparatus for erecting an arched building member wherein a longitudinal compressive force is applied to said member effective to camber it upwardly to a required extent within the elastic limit of said member and locking the member is said cambered condition.

The compressive force may be applied to one end of the building member, the other end being anchored to hinge means. Preferably the compressive force is applied to a bearing block to which one end of the building member is connected, said bearing block being slideably mounted in guide means.

Advantageously the method and apparatus is applied to a plurality of building members interconnected by rigid cross members, preferably supporting flexible cladding.

In one apparatus for carrying out the method of this invention, the compressive force is applied by hydraulic ram means, for example, by two hydraulic rams acting alternately on each bearing block, one ram being advanced before inserting a packing member between the bearing block and the other, retracted ram. The building member may be locked in its required condition by one or more locking blocks which restrain outward movement of the bearing block in its guide means.

The hinge means at one end of the building member and/or the bearing block at the other end of said member may comprise pin joints which permit rotation of said member in a vertically longitudinal plane.

The method of the invention will normally be applied to building members laid on the ground and then cambered upwardly to a desired configuration.

It is desirable that the building member is given a small upward priming curve in order to ensure that it will smoothly camber upward without undesired buckling when the compressive force is applied. Such a priming curve may be produced by a plurality of mobile props, for example, on casters, across which the building member is laid.

Although one preferred method and apparatus for cambering the building member utilizes hydraulic rams, this operation may also be performed by tensioning a cable or rope connected to each end of the building member.

Each end of the member may be slideably mounted in guide means, and the cable may then be tensioned, for example by a winch, in order to produce a desired degree of camber. The winch means are then removed and the building member is maintained in its desired configuration by a permanent cable connecting its ends.

The cable may be buried under the floor of the building formed by the arched building member.

This embodiment of the invention has the advantage that there is no outward force on the foundations of the building member, and therefore the sheet pile foundations necessary when the building member is erected by hydraulic jacks are no longer needed, or may at least only be made strong enough to resist wind loads.

Alternatively, one end of the building member may be connected to hinge means and the other end may be winched inwardly by tension in a cable, the winch being centrally positioned on the outer side of the centerline of the said hinge means and interconnected to bearing or hinge means, in such manner as to provide an equal and opposite balancing force at that point.

When a plurality of arched building members, for example forming a roof, are erected, it is not necessary to erect them all at the same time. They may, for example, be cambered upwardly three at a time, thus reducing the amount of equipment needed.

Nor is it necessary for the guide means for the end of the building member which is forced inwardly during the erecting operation to be a permanent part of the finished building. The guide means may be made in the form of a plurality of blocks held together by longitudinal tie bolts and may be disassembled after the completion of the building. However, if the guides are left to form a permanent feature of the building, the space between each pair of guides is conveniently used for parking a motor vehicle.

The building members erected by the method and apparatus according to the invention will generally form a shed or hangar, which may be either permanent or temporary. The use of very large spans, for example over two hundred feet, is contemplated. The span and rise of the completed shed or hangar may be adjusted at any time during the life of the building, according to requirements. A dome might also be erected by arching a plurality of building members to form a hemispherical framework on which cladding could be supported.

Another use envisaged for the method and apparatus of the invention is for the erection of arcuate shuttering, without the use of intermediate vertical and/or inclined props along the span, for the construction of a reinforced concrete arch. The procedure would be to erect one or more arched building members carrying flexible shuttering and then to cover the shuttering with a first layer of lightweight reinforced concrete; when this had set, the remainer of the structural ordinary reinforced concrete might be poured or placed thereon, in one or more consecutive additional layers to complete the reinforced concrete arch.

The material, from which the building member erected by the method according to the invention is constructed, may be chosen from a variety of possible materials. For example, the material may be of metal, of glass fiber reinforced synthetic resins, of timber or laminated timber, and of any combination of these materials, for the construction of the longitudinal ribs, cross members and cladding, in accordance with the circumstances of the case as to whether a permanent or temporary building is required.

Another possibility is to make the building member out of corrugated sheeting of adequate thickness provided with an edge beam to distribute the compressive force necessary to camber the member upwardly.

It may be advantageous to apply the cladding before erecting the building members attached thereto. The cladding will then be under tension, and this will add to the rigidity of the structure.

The two ends of a building erected in the manner of the invention may be walled in or formed of cladding attached to vertical members.

BRIEF DESCRIPTION OF THE DRAWINGS

The invention is illustrated by way of example, in the accompanying drawings, in which:

FIG. 5 is an isometric view of the plan view and end elevation view illustrated in FIGS. 3 and 4.

FIG. 6 is an exploded, isometric view illustrating a fixed bearing assembly.

FIG. 7 is an exploded, isometric view of an adjustable bearing assembly.

FIG. 8 is a plan view of the bearing assembly illustrated in FIG. 6.

FIG. 9 is a vertical sectional view of the bearing assembly illustrated in FIG. 8.

FIG. 10 is a plan view of the adjustable bearing assembly illustrated in FIG. 7.

FIG. 11 is an elevational view of the adjustable bearing assembly illustrated in FIG. 10.

FIG. 12 is an isometric view of the adjustable bearing assembly illustrating the manner in which same is utilized.

FIGS. 13-16 are vertical, sectional views of the adjustable bearing assembly illustrating the sequential steps in the use thereof for erecting an arched building member.

FIG. 17 is a partial isometric view of a building member having cladding secured thereto.

SUMMARY OF THE INVENTION

Figure 1:
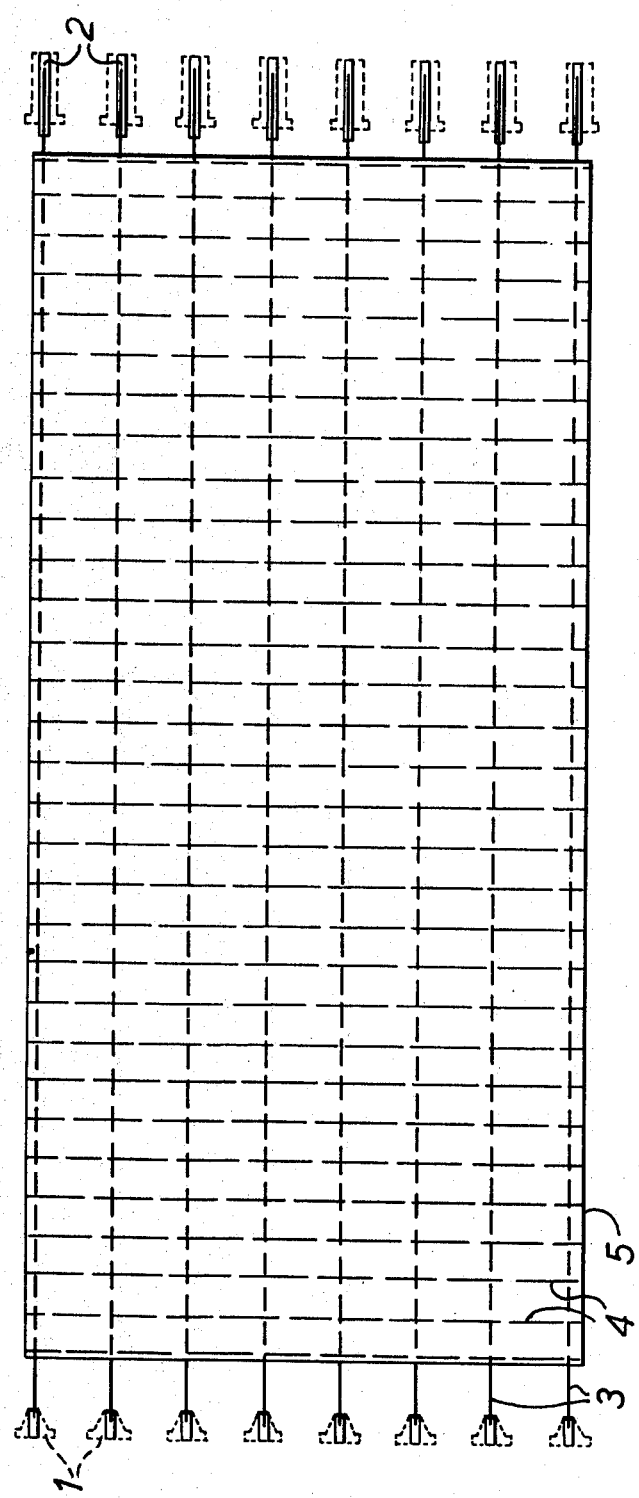
FIG. 1 is a plan view of an assembled structure for a shed to an initial and temporary shape on the ground.

The objects and purposes of the present invention are met by providing a method and an apparatus wherein an arched building member is interconnected adjacent opposite ends thereof to a pair of bearing assemblies, each of which contains hinge means thereon for interconnecting the ends of the arched member to the bearing assembly. One of the bearing assemblies is preferably adjustable and contains a movable portion which is slideable in a direction toward the other bearing assembly, whereupon application of a force to the movable portion so as to move same in a direction toward the other bearing assembly, which bearing assembly is preferably held stationary, causes the arch to bow laterally outwardly so as to assume its desired arched position. The movable portion of the bearing assembly is then fixedly secured after the arch has assumed its desired position.

The apparatus for accomplishing the above method in one preferred form of the invention utilizes a bearing assembly having a movable portion slideably mounted thereon, which bearing assembly further includes a pair of substantially parallel guide grooves in which are positionable a plurality of block members. A pair of hydraulic rams coact between the frame of the bearing assembly and the movable portion for alternately stepping same forwardly in a direction toward the other bearing assembly, whereupon the block members are alternately positionable within the guide members so as to maintain the movable portion in the intermediate stepped positions. A further preferred apparatus for performing the method utilizes an elongated flexible cable-like element interconnected between the bearing assemblies with one end of the cable being fixed to one bearing assembly and being movable relative to the other bearing assembly, whereupon a tension force is applied to the cable for causing the movable portion of one bearing assembly to move in a direction toward the other bearing assembly for causing the building member to assume the desired arch.

DETAILED DESCRIPTION

The construction illustrated in FIGS. 1-16 comprises fixed bearing assemblies 1 (FIG. 5), further bearing assemblies having adjustment means 2, semiflexible ribs 3, rigid purlins 4 rigidly fixed to ribs 3, and flexible cladding 5 fixed to purlins 4, illustrated and described in further detail hereinafter.

FIG. 6 shows the fixed bearing assembly 1 (shown in FIG. 5), comprising a sheet-pile foundation 6, a capping beam 7, a fixed bearing block 8, an extremity 9 of the semiflexible rib 3, a flexible rib terminal socket 10, a bearing pin 11, two brackets 12 and four fixing screws 13.

FIGS. 8 and 9 are respectively a plan view and a vertical section view of the bearing assembly 1.

FIG. 7 shows a blown-up isometric view of the adjustable bearing assembly 2 (FIG. 5), comprising a sheet-pile foundation 14, a capping beam 15, a foundation slab 16, a movable bearing block 18, an upper layer of movable packing blocks 19, a lower layer of movable packing blocks 20, an upper locking block 21, a lower locking block 22, upper and lower hydraulic rams 23 and 24, respectively, anchored to the closed end of a restraining guide 17, the other extremity 9 of the semiflexible rib 3, a terminal socket 25, bearing pin 26, two brackets 27, four fixing screws 28, two insertion openings 29 on one side of the restraining guide 17, and two similar insertion openings 30 on opposite sides of the restraining guide 17.

FIGS. 10 and 11 are respectively a plan view and a vertical section view of the adjustable bearing assembly 2 (FIG. 5), comprising the sheet-pile foundation 14, the capping beam 15, the foundation slab 16, the restraining guide 17, the movable bearing block 18, the upper layer of movable packing blocks 19, the lower layer of movable packing blocks 20, the upper and lower locking blocks 21 and 22, the upper and lower hydraulic rams 23 and 24, the other extremity 9 of the semiflexible rib, the socket 25 and the bearing pin 26.

OPERATION

The constructional procedure of the invention, here illustrated, is as follows:

On the fixed bearing assemblies side 1 (FIG. 1), sheet-pile foundations 6 (FIG. 6) are driven into the ground, capping beam 7 is formed over same, and fixed bearing block 8 is anchored thereon. One extremity 9 of semiflexible rib 3 with its socket 10 and bearing pin 11 are interconnected and coupled to bearing block 8 and fixed thereto with two brackets 12 and four screws 13 so as to allow for movement of flexible rib 9 in a vertical plane passing through its longitudinal centerline and hinging about the axis of bearing pin 11.

On the adjustable bearing assemblies side 2 (FIG. 1), sheet-pile foundations 14 (FIG. 7) are driven into the ground, capping beam 15 and foundation slab 16 are formed monolithically over same and restraining guide 17 is anchored thereon. Hydraulic rams 23 and 24 are anchored onto the inner face of the closed end of restraining guide 17, and the movable bearing block 18 is pushed horizontally down the open end of the restraining guide 17 to meet the faces of the retracted hydraulic rams 23 and 24. The other extremity of the semiflexible rib 9, fitted with socket 25 and pin 26, is coupled and fixed to the movable bearing block 18 by means of the two brackets 27 and the four screws 28.

A number of semiflexible ribs 3 having extremities 9 and fixed bearing assemblies 1, with corresponding numbers of adjustable bearing assemblies 2, are constructed and interconnected as herein previously described and illustrated in FIGS. 1, 2, 6 and 7.

Figure 2:
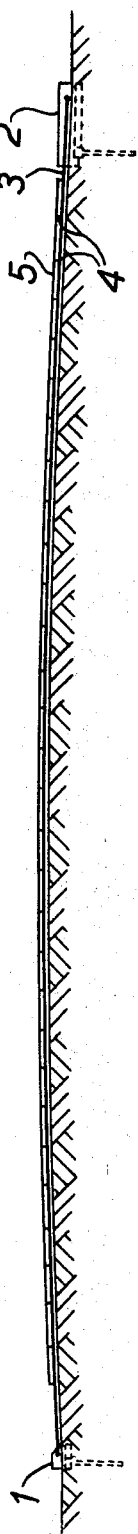
FIG. 2 is an end elevation of the plan view illustrated in FIG. 1.
Figure 3:
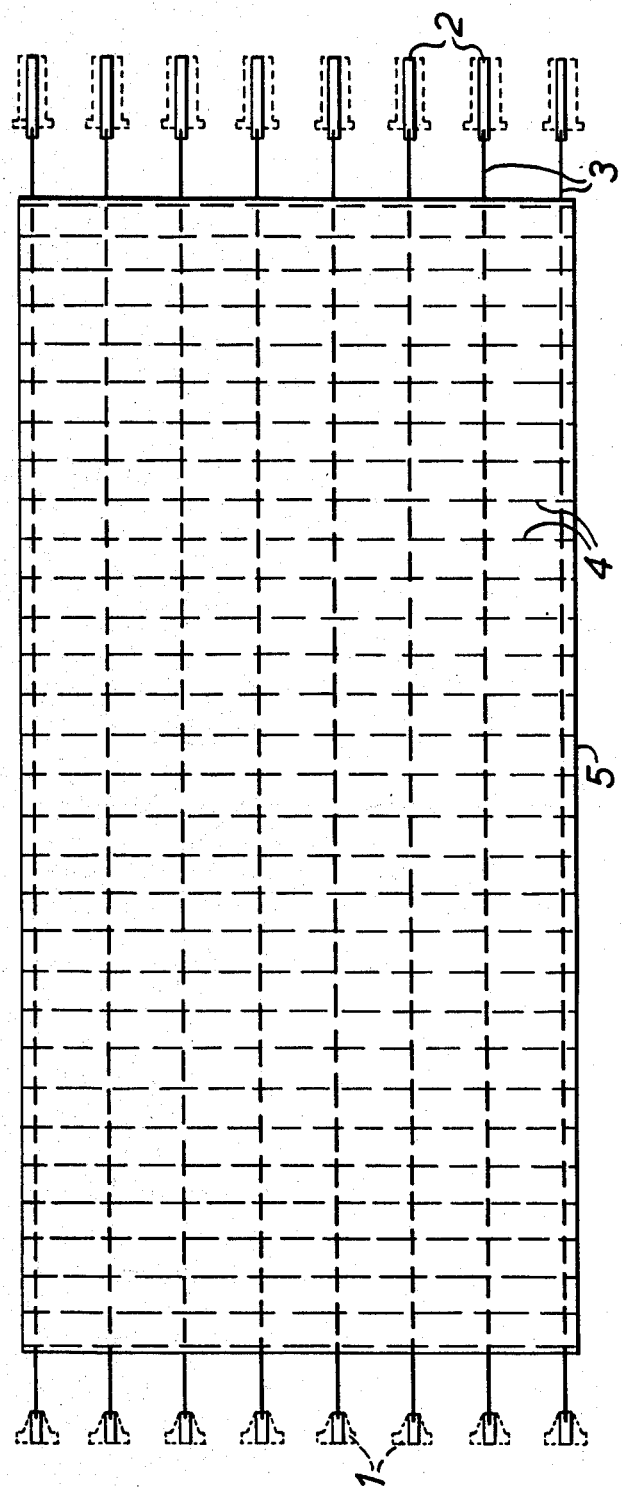
FIG. 3 is a plan view of a shed erected to a designed span rise and shape, according to this invention.
Figure 4:
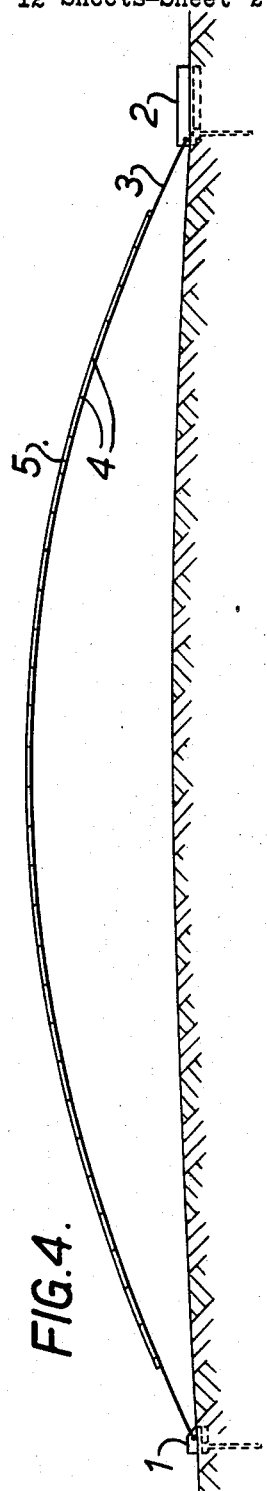
FIG. 4 is an end elevation of the plan view illustrated in FIG. 3.
Figure 13:
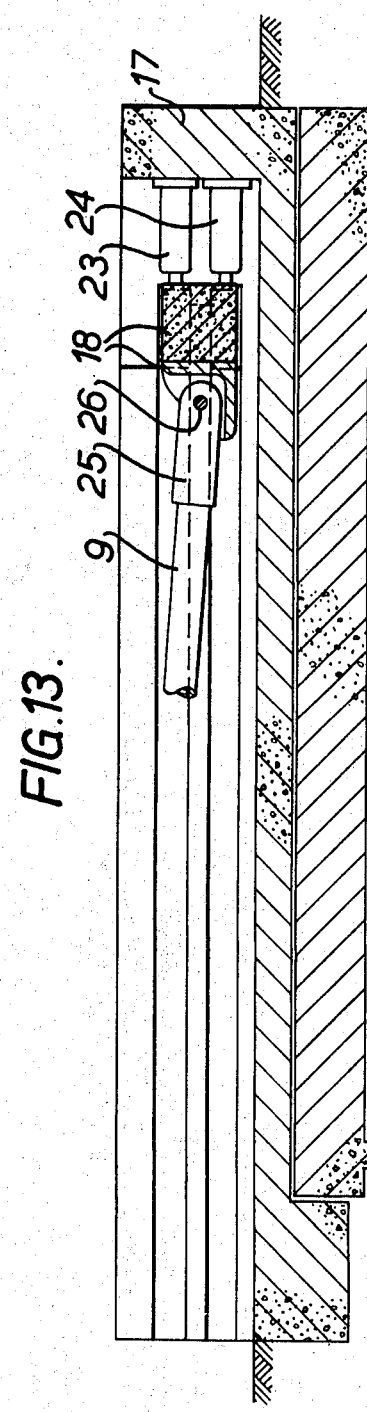

A required number of rigid purlins 4 (FIGS. 1, 2 and 17) are spanned and rigidly fixed onto and across the semiflexible ribs 3 in parallel arrangements as illustrated in FIGS. 1 and 2.

Cladding sheeting 5 (FIGS. 1, 2 and 17) is spanned over the rigid purlins 4 (FIG. 1) and fixed thereon.

Forces are applied horizontally, by means of double-acting hydraulic rams 23 and 24 (FIG. 12), to the adjacent faces of the movable bearing blocks 18. Hydraulic rams 23 are connected to one hydraulic pump (not shown on the drawings), and hydraulic rams 24 are connected to another hydraulic pump (not shown on the drawings). In preparation for commencement of the ramming operation, the movable bearing assemblies 2 (FIGS. 1 and 2) are arranged as illustrated in FIG. 12 with the extremity 9 of a semiflexible rib being connected with the movable bearing block 18 which bearing block abuts against the faces of the retracted rams 23 and 24. An upper layer of movable packing blocks 19 is shown ready to be placed intermittently into position in the direction indicated by the arrow, while a lower layer of movable packing blocks 20 is shown as being ready to be inserted intermittently through a lower insertion opening 29 in the direction indicated by the corresponding arrow. FIG. 12 also depicts upper and lower locking blocks which are to be inserted and spanned across the upper and lower insertion openings 29 and 30 (FIGS. 7 and 12).

Figure 14:
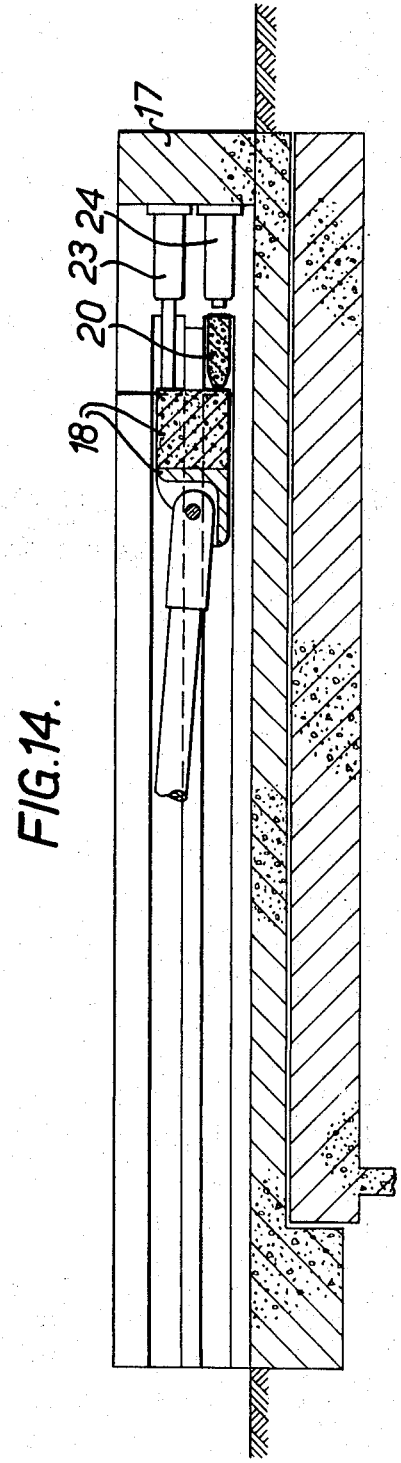

The sequence of ramming operation is depicted in FIGS 13, 14, 15 and 16, and described as follows:

Rams 23 provide a forward stroke to the movable bearing blocks 18, pushing same along the restraining guide 17, thus enabling insertion of the first packing blocks 20 (FIG. 14).

Rams 24 then provide a forward stroke to the movable packing blocks 20, pushing same along and together with the movable bearing blocks 18. Rams 23 are retracted and first packing blocks 19 are positioned in front of rams 23 (FIG. 15).

Rams 23 then provide a forward stroke to the movable packing blocks 19, thus completing one cycle of the ramming operation as illustrated in FIG. 16.

Each move imparted, as previously described, to movable bearing blocks 18, will transmit horizontal thrust on the bearing pins 26 which will in turn force flexible ribs 9, mounted on said pins 26, to meet at their opposite ends an equal and opposite reaction from the fixed bearing assemblies 1 (FIGS. 1 and 2) and thus cause the semiflexible ribs having extremities 9 to strain and camber upward in a vertical plane containing their longitudinal centerline in stages and magnitude corresponding to the prevailing number of movable packing blocks 19 or 20 interposed between the faces of the rams 23 or 24 and the adjacent face of the movable bearing blocks 18.

When a designed camber or rise and span of the arch or barrel vault formed by the deflected semiflexible ribs is attained, hydraulic rams 24 are retracted, locking blocks 22 are inserted to span across the lower insertion openings 29 and 30 (FIG. 7), and rams 24 are extended forward sufficiently to hold the lower layer of packing blocks 20 and locking blocks 22 in their prevailing position. Rams 23 are then retracted and locking blocks 21 are inserted to span across the upper insertion openings 29 and 30 (FIG. 7). Rams 24 and 23 are then retracted and may be disconnected from their respective hydraulic pumps and removed. At completion of the described ramming operation or part thereof, the shed's structure obtains a rise, span and shape illustrated in FIGS. 3, 4 and 5, or any corresponding intermediate rise, span and shape illustrated in FIGS. 1, 2, 3 and 4.

For lowering the rise and consequently increasing the span correspondingly and simultaneously, a reverse method and operation of the ramming procedure, here described, is adopted.

MODIFICATIONS

Figure 18:
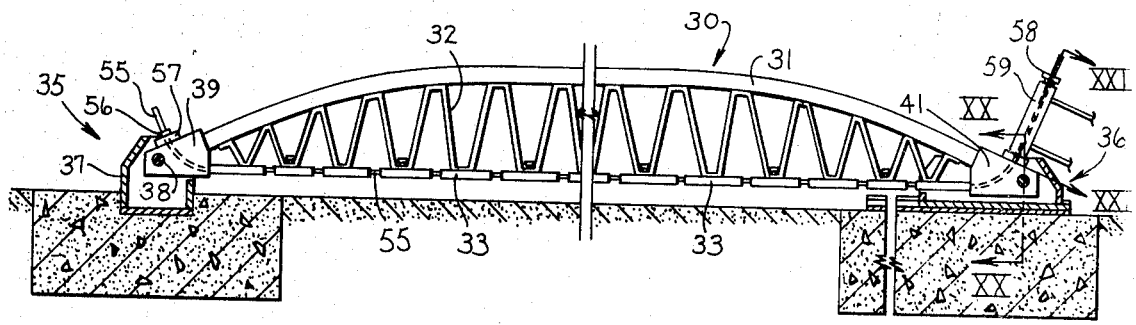
FIG. 18 is a broken, elevational view illustrating a modified apparatus and method for arching a building member according to the present invention.

FIGS. 18–21 illustrate a modified apparatus and method accoding to the present invention. As illustrated in FIG. 18, the support member 30 comprises an arched, semiflexible member 31 having a plurality of truss members 32 secured thereto, which truss members have sleeves or guide members 33 thereon.

The support member 30 is connected to anchor or bearing assemblies 35 and 36 adjacent the oppostie ends thereof, which bearing assemblies are adapted to be secured to a support means, such as the ground, by suitable foundation means which can be similar to the foundations illustrated in FIGS. 6 and 7.

Specifically, the bearing assembly 35 is a stationary bearing assembly and comprises a frame 37 secured to the gorund and having a pivot pin 38 connected thereto for pivotally securing a movable portion 39 of the bearing assembly to the frame. The movable portion 39 is interconnected to one end of the support member 30 whereupon that end of the support member can angularly move relative to the fixed bearing assembly 35.

The other bearing assembly 36 is an adjustable bearing assembly and includes a hingeable movable portion 41 pivotally mounted by means of a pin 42 on a slideable portion 43, which portion is mounted on a base frame 44 secured to the ground. The pivoted portion 41 is connected to the other end of the support member 30 so as to permit same to be angularly moved relative to the adjustable bearing assembly 36 during the arching process.

Figure 20:
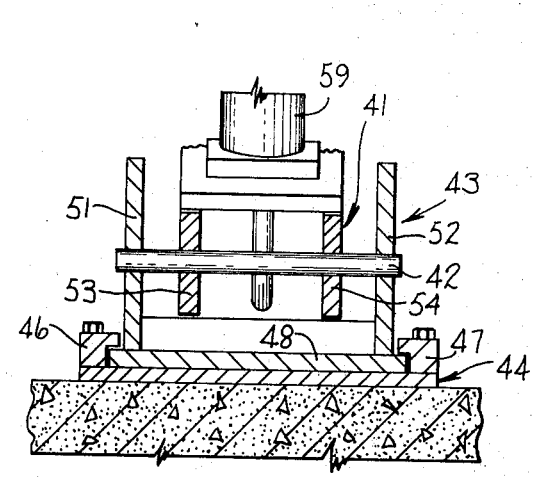
FIG. 20 is an enlarged, partial cross-sectional view taken along the line XX—XX in FIG. 18.

As illustrated in FIG. 20, the base frame 44 has a pair of vertically extending walls 46 and 47 having inwardly directed flanges on the upper edges thereof so as to define an elongated recess or guide for slideably confining the slideable portion 43. The slideable portion 43 has a bottom wall 48 which is positioned on and slideable relative to the base member 44 and is confined underneath the flanges contained on the sidewalls 46 and 47. The base wall 48 has a pair of upstanding sidewalls 51 and 52 fixedly secured thereto, which sidewalls support the pivot pin 42.

The movable hinge portion 41 is provided with a pair of parallel side plates 53 and 54 which, as illustrated in FIG. 20, are positioned between the side plates 51 and 52 and are inerconnected thereto by means of the pivot pin 42. The pivot portion 41 is thus connected to the slideable portion 43 for rectilinear movement therewith while also being mounted for pivotal movement relative thereto.

Figure 19:
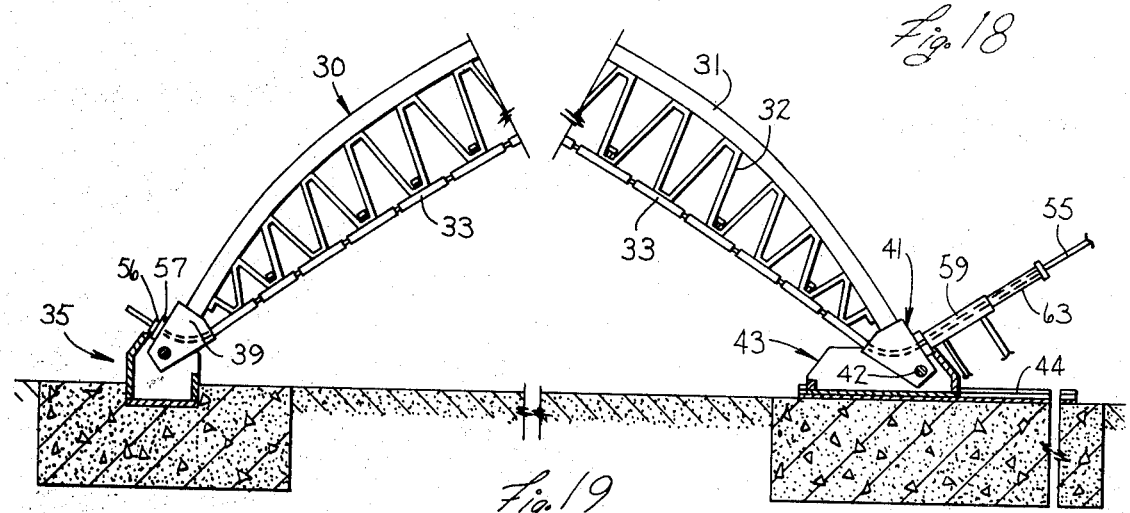
FIG. 19 is a broken, side elevational view similar to FIG. 18, but illustrating the building member in the arched and erected position.

To permit the adjustable bearing assembly 36 to be moved in a direction toward the stationary bearing assembly 35 during the arching process, there is provided a flexible cable-like element 55 extending between the bearing assemblies, which cable element is, in the preferred embodiment, illustrated in FIGS. 18 and 19, confined within the guide members 33 so as to comprise a portion of the support member 30 when same is in the arched position illustrated in FIG. 19. Specifically, one end of the cable 55 is anchored relative to one of the bearing assemblies and the other end of the cable is movable relative thereto so as to impose a tension force on the cable which results in relative movement between the bearing assemblies in a direction toward one another so as to cause the support member 30 to be cambered outwardly into the arched position.

As illustrated in FIGS. 18 and 19, the leftward end of the cable 55 is provided with an abutment or stop member 56 fixedly secured thereto, which member bears against a support plate 57 fixedly secured to the movable hinge portion 59 so as to prevent the leftward end of the cable 55 from being moved rightwardly in FIG. 18. The rightward end of the cable is provided with a similar stop member 58 fixedly secured thereto, which member coacts with a fluid pressure power cylinder 59 fixedly mounted to the pivotal portion 41.

Figure 21:
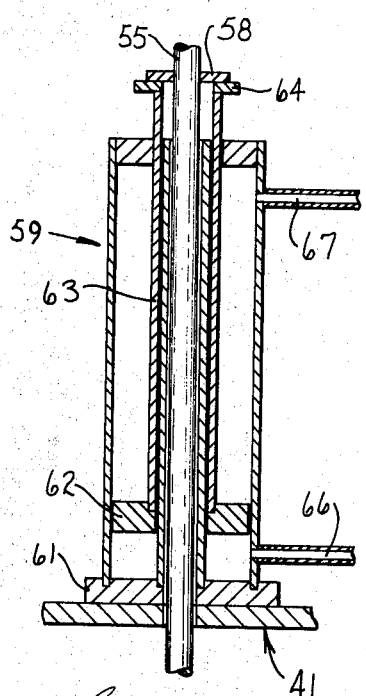
FIG. 21 is an enlarged, partial cross-sectional view taken along the line XXI—XXI in FIG. 18.

As illustrated in FIG. 21, the power cylinder 59 has a base plate 61 which is fixedly secured to the hinged portion 41 whereby the power cylinder will move with the hinge portion as the support member is cambered upwardly. The power cylinder contains a piston 62 therein which is connected to a piston rod 63 which extends beyond the upper end of the power cylinder and is provided with an abutment surface 64 fixedly secured thereto, which abutment surface is adapted to contact the stop member 58 fixedly secured to the cable 55. The piston rod 63 is hollow so as to permit the cable 55 to extend therethrough in the manner illustrated in FIG. 21. A pair of conduits 66 and 67 interconnect the opposite ends of the power cylinder to a pressure source, such as a pump, whereby pressurized fluid can be supplied to the power cylinder for actuating same.

Considering now the operation of the embodiment illustrated in FIGS. 18–21, assuming the support member to be in the position illustrated in FIG. 18, the cable 55 will extend between the bearing assemblies with the stop member 56 being positioned adjacent the support plate 57 at the leftward end thereof and the stop member 58 being positioned adjacent the abutment plate 64, the piston rod 63 being in the retracted position illustrated in FIG. 21. Pressurized fluid is then supplied through the conduit 66 so as to tend to move the piston rod 63 upwardly, which causes the abutment plate 64 to contact and push against the abutment plate 58 so as to tend to move same. However, since the other end of the cable 55 is anchored due to the abutment plate 56 contacting the support plate 57, a tension force is imposed on the cable 55. Imposition of the tension force on the cable 55 by the power cylinder 59 causes the development of an equal and opposite reaction force on the movable support member 41 and on the slideable support portion 43, which causes the slideable portion 43 to be moved in a direction toward the stationary bearing assembly 35 (leftwardly in FIGS. 18 and 19). This movement of the slideable portion 43 toward the stationary bearing assembly 35 imposes a longitudinal compressive force on the support member 30 whereupon same is caused to camber upwardly into the position illustrated in FIG. 19.

After the support member has been moved into the cambered or arched position in FIG. 19, the slideable portion 43 can be fixedly secured relative to the base frame member 44 by any suitable means, such as by the bearing blocks illustrated in FIG. 12, thereby maintaining the support member in its cambered position. Further, the free end of the cable (rightward end in FIG. 19) can be suitably interconnected or anchored relative to a supper member in any conventional manner whereupon the cable thus constitutes a portion of the support member 30. Accordingly, the fluid pressure can then be relieved from the power cylinder 59 so as to de-energize same.

While the power cylinder has been disclosed as being mounted on the adjustable bearing assembly, it will be apparent that it could be mounted on the fixed bearing assembly. Alternatively, a power cylinder could be mounted on each bearing assembly.

With the support structure 30 in its raised position, grub screws 70, provided in selected ones of the sleeves 33, are tightened to rigidly fix the cable 55 with respect to said sleeves.

It is further contemplated that the stop member 56 may consist of a collar type wedge surrounding the cable 55 and wedgeable in the support plate for fixedly securing the cable thereto.

Further, a conventional incremental hydraulic jack, of the type having pulling means repetitively actuable for engaging and advancing therepast succesive lengths of the cable 55 and stop means for holding the cable 55 fixed between pulling steps, may be substituted for the pressure fluid cylinder 59. Such may be found convenient where the support structure 30 is particularly large and requires a long travel of the slideable portion 43 and hence pulling of a long length of cable therepast.

It is further contemplated that, if desired, a second adjustable bearing assembly, similar to the assembly 36 may be substituted for the fixed bearing assembly 35.

While particular preferred embodiments of the invention have been disclosed above for illustrative purposes, it will be understood that variations or modifications thereof which lie within the scope of the appended claims, are fully contemplated.

The embodiments of the invention in which an exclusive property or privilege is claimed are defined as follows:

1. In combination with an elongated arched building member having guide means thereon, an apparatus for erecting and bowing said arched building member, comprising:

first anchor means adapted to be positioned adjacent and interconnected to one end of said building member, said first anchor means including a stationary base portion and a first movable portion mounted on said base portion for pivotable movement relative thereto about a first pivot axis, said first movable portion being interconnected to said one end of said building member, and said first movable portion further being mounted on said base portion for slideable rectilinear movement relative thereto in a plane substantially transverse to said first pivot axis;

second anchor means adapted to be positioned adjacent to and interconnected to the other end of said building member, said second anchor means including a stationary frame member and a second movable portion mounted on said frame member for pivotable movement relative thereto about a second pivot axis substantially parallel to said first pivot axis, said second movable portion being interconnected to the other end of said building member;

movement means coacting with and between the first and second movable portions for causing the first and second movable portions to be relatively moved toward one another for causing the arched building member positioned therebetween to be bowed laterally outwardly;

said movement means including an elongated, flexible cable-like element having an intermediate portion extending between said first and second movable portions and confined within the guide means secured to said building member for substantially preventing relative lateral displacement between said building member and the intermediate portion of said cable-like element when said building member is bowed laterally outwardly;

said cable-like element further including opposite end portions respectively interconnected to said first and second anchor means; and said movement means further including power means coacting between said cable-like element and one of said anchor means for gripping said element and applying a longitudinal tension force thereto for causing (1) relative movement between one end portion of said cable-like element and said one anchor means and (2) relative movement between said first and second movable portions in a direction toward one another, whereby said building member and the intermediate portion of said cable-like element are bowed laterally outwardly.

2. An apparatus as defined in claim 1, wherein the one end portion of said cable-like element is slideable relative to said one anchor means, the other end portion of said cable-like element being fixed relative to the other anchor means.

3. An apparatus according to claim 1, wherein said cable-like element is longitudinally slideaby received within said guide means.

4. An apparatus according to claim 1, further including means for anchoring opposite ends of said cable-like element in a stationary position when said element and said building member have been bowed laterally outwardly, whereby said cable-like element comprises a structural portion of said building member.

5. An apparatus according to claim 1, wherein said guide means includes a plurality of spaced-apart guide members secured to said building member and disposed in a row extending between said first and second anchor means, the intermediate portion of said cable-like element being slideably disposed within said row of guide members whereby the intermediate portion of said cable bows laterally outwardly in correspondence with said building member when said first and second movable portions are moved relatively toward one another due to imposition of a longitudinal tensile force on said cable-like element.

6. A method for erecting and bowing an arched building member having guide means extending longitudinally thereof, comprising the steps of:
  anchoring a first end of the building member for permitting pivotable movement of said first end within a plane extending longitudinally of the building member;
  anchoring the second end of the building member for permitting pivotal movement of the second end within the longitudinal plane of the building member while also permitting linear movement of the second end toward the first end;
  positioning an elongated flexible cable on and lengthwise of the building member and interconnecting the opposite end portions of said cable to said ends of said building member;
  confining said cable on said building member by positioning same within said guide means for preventing any substantial lateral movement of said cable relative to said building member within said longitudinal plane; and
  bowing said arched building member and said cable simultaneously laterally outwardly within said longitudinal plane by
  (1) applying an outward pulling force to one end portion of said cable for creating a tensile force within said cable, and
  (2) moving one end of said building member linearly toward the other end thereof due to the compressive reaction force imposed on said building member by said cable.

7. A method according to claim 6, wherein the pulling force applied to the one end portion of said cable causes said one end portion of said cable to move outwardly relative to the associated end of the building member whereby the length of the intermediate portion of the cable extending between the first and second ends of the building member is shortened, shortening of the intermediate portion of the cable causing the first and second ends of the building member to be relatively moved toward one another for causing simultaneously lateral bowing of the building member and the intermediate portion of the cable.

8. A method according to claim 6, further including the step of fixedly locking the opposite end portions of said cable relative to the ends of said building member, after the cable and the building member have been simultaneously bowed laterally outwardly, for permanently maintaining the building member and the cable in a bowed condition, the cable thus comprising a structural part of the building member and being capable of flexing at points spaced along the length of the building member.

References Cited
UNITED STATES PATENTS

| | | | |
|---|---|---|---|
| 2,793,720 | 5/1957 | Hawes | 52—645 |
| 2,948,047 | 8/1960 | Peeler et al. | 52—741 |
| 3,057,119 | 10/1962 | Kessler | 52—741 |
| 3,176,961 | 4/1965 | Glass | 254—29 |
| 3,394,452 | 7/1968 | Albrecht | 29—596 |
| 3,399,865 | 9/1968 | Kelly | 254—29 |

FRANK L. ABBOTT, Primary Examiner

J. L. RIDGILL, Jr., Assistant Examiner

U.S. Cl. X.R.

29—429, 445; 52—640, 741